Patented Jan. 9, 1951

2,537,645

UNITED STATES PATENT OFFICE 2,537,645

AMINES AS GEL-SHRINKAGE REDUCING AGENTS IN SYNTHETIC-RUBBER SPONGE

Leonard A. Wohler, Akron, and Ernst Schmidt, Cuyahoga Falls, Ohio, assignors to The Firestone Tire & Rubber Company, Akron, Ohio, a corporation of Ohio No Drawing. Application June 23, 1947, Serial No. 756,556

8 Claims. (Cl. 260—2.5)

This invention relates to the production of foamed latex sponge products, such as seat mattresses, cushions, etc. The latex employed is preferably a latex of GR–S which may contain latex of natural rubber. Instead of GR–S latex there may be used the latex of other rubber-like copolymer of a conjugated diene—for example, butadiene, piperylene, cyclopentadiene, dimethylbutadiene, isoprene, 2-cyanobutadiene, 2-methyl-1,3-pentadiene, etc.—and a vinyl aromatic compound—for example, styrene, alpha-methylstyrene, nuclear-substituted styrene, monochlorostyrene, dichlorostyrene, vinylbiphenyl, vinylcarbazole, vinylnaphthalene, 2-vinyl-5-ethylpyridine, 2-ethyl-5-vinylpyridine, etc. The latex is obtained by emulsion copolymerization of the monomers mentioned.

One very troublesome defect encountered in the making of foamed latex sponge is that known as gel shrinkage. This shrinkage occurs during the gelling or curing period, and it is greater in sponges made from latex of a copolymer of a conjugated diene and a vinyl aromatic compound than in that from other latices. The sponge made from such latex may shrink as much as 50 per cent in volume. Defective products result from such shrinkage, and although various attempts have been made to eliminate it or minimize the damage which results from it, no entirely satisfactory solution has heretofore been developed.

It has now been found that gel shrinkage in foamed sponges made from such latices can be greatly reduced if there is incorporated in the foamed latex from which the sponge is formed an amine from the class consisting of cyclohexyl, benzyl, n-propl, n-butyl, and n-amyl amines. The amine may be used in the form of a fatty acid soap of the amine obtained from any soap-forming fatty acid, such as, for example, oleic, stearic, palmitic or ricinoleic acid, etc.

The preparation of the sponge may, in general, follow the procedure of the example which follows. The compounding ingredients are preferably dispersed in aqueous dispersions and then mixed. The following, in which the weights are given as dry weights and the amount of water in each dispersion is given in the parenthetical explanations, is illustrative:

| | Parts by weight |
|---|---|
| Dispersion A: | |
|   Cyclohexyl amine | 3 |
|   Potassium castor oil soap (35% aqueous dispersion) | 2 |
| Dispersion B: | |
|   Sulfur (50% aqueous dispersion) | 2 |
|   Piperidine pentamethylene dithiocarbamate (40% aqueous dispersion) | 1.5 |
|   Sym. di - $\beta$ - naphthyl - paraphenylene - diamine (40% aqueous dispersion) | 1.0 |
| Dispersion C: | |
|   GR–S latex (aqueous dispersion containing 55% copolymer of 70% butadiene and 30% styrene) | 100 |
| Dispersion D: | |
|   Zinc oxide (50% aqueous dispersion) | 5 |
| Dispersion E: | |
|   Sodium silicofluoride (50% aqueous dispersion) | 2.5 |

Dispersions B through E may be formed by ball-milling aqueous mixtures of the ingredients with a small amount of a dispersing agent. An alkyl naphthalene sulfonic acid sodium salt of short alkyl chain and a mixture of monosodium salt of polymerized arylalkyl sulfonic acids and inorganic suspending agent, known respectively as Daxad No. 11 and Daxad No. 27, manufactured by Dewey and Almy Chemical Company, of Cambridge, Massachusetts, are mentioned as dispersing agent which may be employed.

Dispersion A is then added to Dispersion B with stirring. The resultant is added to GR–S latex. Dispersion D is then added. The resultant is set aside to mature. It matures relatively rapidly, the maturing being complete in 24 hours at 25° C. The dispersion is then whipped to a foam. The mixer, known as Hobart M–80, may be used for this purpose. Dispersion E is then stirred in. Two and a half parts of the fluoride—i. e., 5 parts of the dispersion—is added per 100 parts of copolymer (dry weight). This causes the latex to gel within 5 minutes. The foam is placed in a mold such as a closed aluminum mold for a mattress or the like, is allowed to gel, and is then cured for one hour at 100° C. Examination of the cured mold will show no shrinkage.

There are two general types of shrinkage, both of which are prevented by the procedure described; viz., external shrinkage—separation of the sponge from the mold—and internal shrinkage—the formation of undesirable voids within the sponge. Both are overcome by the use of an amine, such as those mentioned.

The following table shows the results of shrinkage tests conducted with latices produced as described. In general, it may be said that about 1 to 5 per cent of any of the amines mentioned may be employed. The table gives additional information which serves as a guide in employing the described procedure with the amines mentioned.

*Shrinkage data*

| Amine | | Per Cent Shrinkage | | Optimum Maturing Time, Days | Gelling Agent |
|---|---|---|---|---|---|
| Name | Per Cent | External | Internal | | |
| none | 0 | 27 | 0 | 4 or more | 29 |
| cyclohexylamine | 1.5 | 0 | 0 | 2 | 43 |
| Do | 2.25 | 0 | 0 | 0 | 45 |
| Do | 3 | 0 | 0 | 0-1 | 53 |
| Do | 4.5 | 1 | some | 0 | 47 |
| Do | 6 | 5 | some | 0 | 50 |
| benzylamine | 3 | 0 | 0 | 0-4 | 55 |
| n-propylamine | 1.8 | 1 | 0 | 2 | 60 |
| n-butylamine | 2 | 0 | 0 | 1-9 | 54 |
| n-amylamine | 2.6 | 0 | 0 | 4 | 57 |

In the above table the amount of amine is expressed in grams per 100 grams copolymer (dry weight). The maturing time is measured in days. As shown by the above table it is not necessary to mature batches which contain either cyclohexylamine or benzylamine. The gelling agent used is sodium silicofluoride, and the figures given are the milligram equivalents which tests have shown to be required for gelling 100 grams (dry weight) of copolymer latex in 5 minutes.

At times it has been found desirable to use natural latex with the copolymer latex. When over fifty per cent of natural latex is used there is no substantial gel shrinkage. Using less than fifty per cent natural latex, such shrinkage is prevented as above described.

The example is illustrative, and modifications may be made therein without departing from the invention which is defined in the appended claims.

What we claim is:

1. The process of producing sponge from latex of rubber-like copolymer of a conjugated diene from the class consisting of butadiene, piperylene, cyclopentadiene, dimethylbutadiene, isoprene, 2-cyanobutadiene and 2-methyl-1,3-pentadiene, and a vinyl aromatic monomer, which comprises producing a foam which includes, in addition to the copolymer, vulcanizing ingredients, gelling agent and about 1 to 5 per cent, based on the copolymer, of a gel-shrinkage-reducing agent from the class consisting of cyclohexyl, benzyl, n-propyl, n-butyl, and n-amyl amines, casting the foam, gelling, and then curing it.

2. The process of producing sponge from foamed latex of rubber-like copolymer of a conjugated diene from the class consisting of butadiene, piperylene, cyclopentadiene, dimethylbutadiene, isoprene, 2-cyanobutadiene and 2-methyl-1,3-pentadiene, and a vinyl aromatic monomer, which comprises producing a foam which includes, in addition to the copolymer, vulcanizing ingredients, gelling agent and about 1 to 5 per cent, based on the copolymer, of a gel-shrinkage-reducing agent which is a soap of an amine of the class consisting of cyclohexyl, benzyl, n-propyl, n-butyl, and n-amyl amines, casting the foam, gelling, and then curing it.

3. The process of producing sponge of foamed latex which comprises foaming a mixture of latices consisting mostly of rubber-like copolymer of a conjugated diene from the class consisting of butadiene, piperylene, cyclopentadiene, dimethylbutadiene, isoprene, 2-cyanobutadiene and 2-methyl-1,3-pentadiene, and a vinyl aromatic monomer and containing latex of natural rubber and in addition, containing vulcanizing ingredients, gelling agent and about 1 to 5 per cent, based on the copolymer, of a gel-shrinkage-reducing agent from the class consisting of cyclohexyl, benzyl, n-propyl, n-butyl, and n-amyl amines, casting the foam, gelling, and then curing.

4. The process of producing sponge from latex which comprises foaming a latex composed essentially of rubber-like copolymer of butadiene and styrene which contains vulcanizing ingredients, gelling agent and about 1 to 5 per cent, based on the copolymer, of a gel-shrinkage-reducing agent from the class consisting of cyclohexyl, benzyl, n-propyl, n-butyl, and n-amyl amines, casting the foam, gelling, and then curing.

5. The process of producing sponge from latex which comprises foaming a mixture of latex composed largely of rubber-like copolymer of butadiene and styrene and containing natural rubber latex, which mixture contains vulcanizing ingredients, gelling agent and about 1 to 5 per cent, based on the copolymer, of a gel-shrinkage-reducing agent from the class consisting of cyclohexyl, benzyl, n-propyl, n-butyl, and n-amyl amines, casting the foam, gelling, and then curing.

6. The step in the process of producing sponge from latex of rubber-like copolymer of butadiene and styrene which comprises incorporating in a foam thereof, in addition to sufficient sodium silicofluoride to effect gelling, about 1 to 5 per cent of cyclohexylamine.

7. The process of producing a sponge from latex which contains no rubber other than natural rubber and rubber-like copolymer of butadiene and styrene, and the rubber content of which is at least fifty per cent rubber-like copolymer of butadiene and styrene, which process comprises producing a foam which in addition to the latex includes vulcanizing ingredients, a gelling agent, and one to five per cent (based on the copolymer) of a gel-shrinkage reducing agent from the class consisting of cyclohexyl, benzyl, n-propyl, n-butyl, and n-amylamines, casting the foam, gelling, and then curing it.

8. The process of producing a sponge which comprises making a first dispersion of three parts by weight of cyclohexyl amine and two parts by weight of potassium castor oil soap, making a second dispersion of two parts by weight of sulfur, 1.5 parts by weight of piperidine pentamethylene dithiocarbamate and one part by weight of symmetrical di-beta-naphthyl-paraphenylene-diamine, adding the first dispersion to the second dispersion with stirring, adding the resulting mixture to a latex of rubber-like copolymer of butadiene and styrene containing 100 parts of the copolymer, adding five parts by weight of a dispersion of zinc oxide, allowing the resultant mixture to mature twenty-four hours at 25° C., whipping the mixture to a foam, adding 2.5 parts by weight of sodium silicofluoride as a dispersion to the foam, transferring the foam to a mold and allowing it to gel, and then curing it for one hour at 100° C.

LEONARD A. WOHLER.
ERNST SCHMIDT.

REFERENCES CITED

The following references are of record in the file of this patent:

UNITED STATES PATENTS

| Number | Name | Date |
|---|---|---|
| 1,852,447 | Chapman | Apr. 5, 1932 |
| 2,234,204 | Starkweather et al. | Nov. 11, 1941 |
| 2,290,567 | MacKay | July 21, 1942 |
| 2,360,913 | Van Valkenburgh | Oct. 24, 1944 |
| 2,444,869 | Clayton | July 6, 1948 |

OTHER REFERENCES

Bachle "Kautschuk," October 1937, Jahrg. 13, pp. 174 to 176.